J. E. McROBERTS.
RESILIENT WHEEL.
APPLICATION FILED NOV. 18, 1921.
1,434,497.
Patented Nov. 7, 1922.
2 SHEETS—SHEET 1.
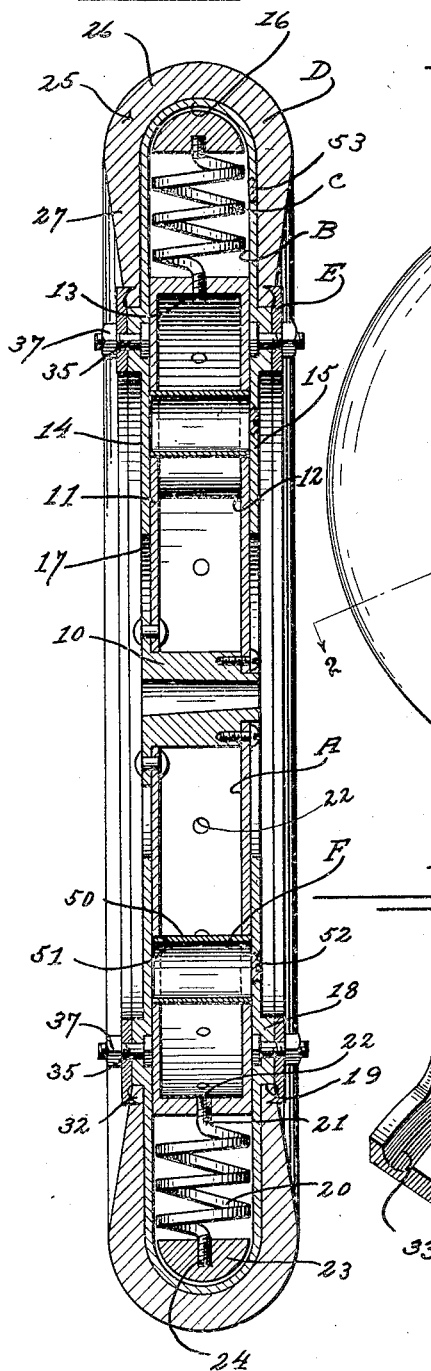
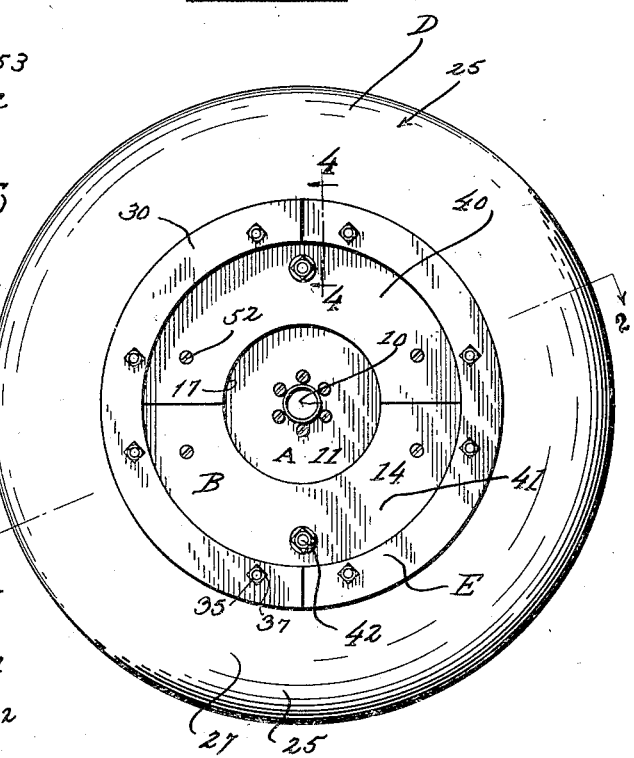
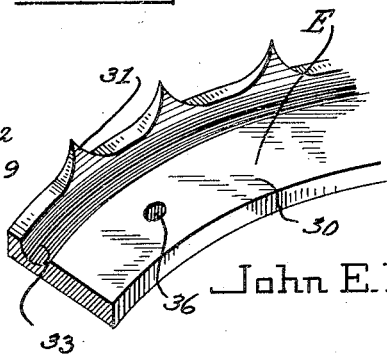
John E. McRoberts
Inventor
By Lancaster and Allwine
Attorneys J. E. McROBERTS.
RESILIENT WHEEL.
APPLICATION FILED NOV. 18, 1921.

1,434,497.

Patented Nov. 7, 1922.
2 SHEETS—SHEET 2.

John E. McRoberts
Inventor

Patented Nov. 7, 1922.

1,434,497

UNITED STATES PATENT OFFICE.

JOHN ELMER McROBERTS, OF PARMA, IDAHO.

RESILIENT WHEEL.

Application filed November 13, 1921. Serial No. 516,169.

*To all whom it may concern:*

Be it known that I, JOHN E. MCROBERTS, a citizen of the United States, residing at Parma, in the county of Canyon and State of Idaho, have invented certain new and useful Improvements in Resilient Wheels, of which the following is a specification.

This invention relates to vehicle wheels and the primary object of the invention is the provision of a novel wheel so constructed as to eliminate the necessity of providing pneumatic means for absorbing shock and thereby to eliminate the difficulty heretobefore experienced with pneumatic tires now in vogue, such as blow-outs, punctures and the like, which not only detract from the pleasure of automobiling, but also add to the cost thereof.

Another object of the invention is the provision of a novel automobile wheel constructed of steel and having incorporated therein spring means for absorbing shock, said spring means being housed in a novel manner and provided with a suitable rubber casing, whereby the contacting of metal with city streets is obviated.

A still further object of the invention is the provision of novel means for effectively lubricating various parts of the steel wheel so as to render the wheel absolutely noiseless in use, the lubricating means consisting of novelly disposed cups for receiving hard grease, and novel means for permitting the packing of the said cups with grease.

A still further object of the invention is the provision of an improved metallic spring wheel of the above character, which will be durable and efficient in use, one that will be simple and easy to manufacture, and one which can be placed upon the market at a reasonable cost.

With these and other objects in view, the invention consists in the novel construction, arrangement and formation of parts that will be hereinafter more specifically described, claimed and illustrated in the accompanying drawings, forming a part of this specification, in which drawings:

Figure 1 is a side elevation of the improved vehicle wheel.

Figure 2 is a diametric section through the same taken on the line 2—2 of Figure 1 and illustrating the novel means of associating the hard grease cups with the wheel for permitting the effective lubrication of all parts thereof.

Figure 3:
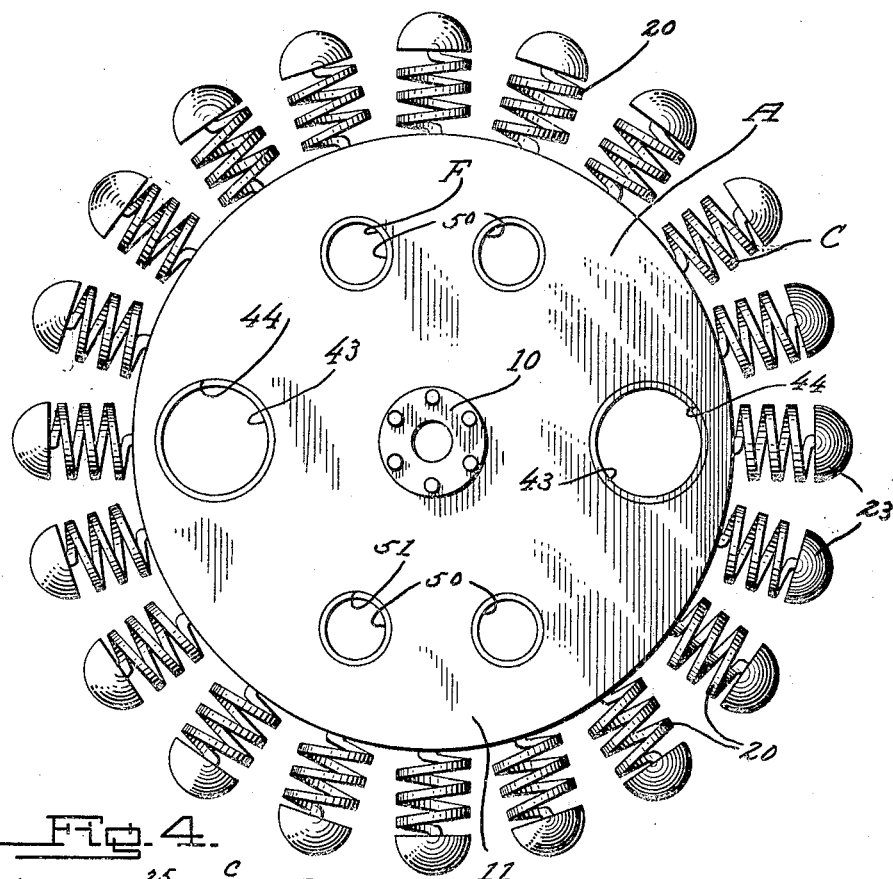
Figure 3 is a side elevation of the inner hub structure of the spring wheel and showing the means for associating the shock absorbing springs and the casing supporting heads with the said hub.
Figure 4:
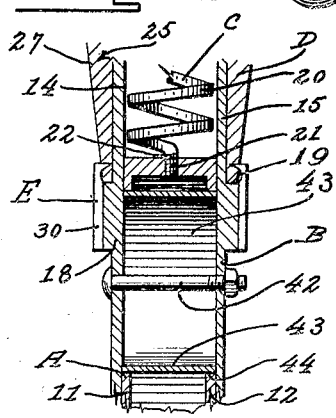

Figure 4 is a fragmentary section taken on the line 4—4 of Figure 1 illustrating the means of connecting the side plates of the felly structure together and illustrating the means carried by the hub structure for receiving said connecting means, and Figure 5 is a fragmentary detail perspective view of a portion of one of the retaining members carried by the felly structure for receiving the casing.

Referring to the drawings in detail, wherein similar reference characters designate corresponding parts, the letter A indicates the inner or hub structure; B, the outer or felly structure; C, the novel means for supporting the felly structure by the hub structure for absorbing shock; D, the casing carried by the felly structure for engaging the ground; and E, the means for securing the casing in place on the felly structure.

The inner or hub structure A includes the axle or spindle box 10 which is adapted to receive the circular side plates 11 and 12. These plates 11 and 12 can be connected at their inner edges to the box 10 in any preferred manner. The outer edges of the side plates 11 and 12 are connected by an annular plate or wall 13 which can be formed relatively thicker than the side plates 11 and 12 if so desired. It is preferred that the annular outer wall 13 and the side plates 11 and 12 be formed integral, but this is not necessary. It can be seen that the entire hub structure is formed of metal and thus it can be seen that a durable construction will be had.

The outer or felly structure B also includes metallic side plates 14 and 15, which are adapted to slidably engage the outer face of the side plates 11 and 12. The side plates 14 and 15 extend beyond the periphery of the outer or connecting wall 13 and have their outer edges connected together by the transversely curved circumferentially extending wall 16. If desirable, the side plates 14 and 15 and the wall 16 can be formed integral. At the axial center of the plates 14 and 15, relatively large concentric openings 17 are formed, so as to permit free movement of the plates 14 and 15 without interfering with the axle box 10 or the axle and parts carried thereby. The outer faces of the plates 14 and 15 intermediate their edges are provided with annular reinforcing ribs 18, the outer surfaces of which define rest shoulders 19, the purpose of which will be hereinafter more fully described.

The resilient means C for connecting the inner or hub structure A with the outer or felly structure B for absorbing shock consists of a plurality of relatively strong coil springs 20. The inner terminals of these springs are connected in any preferred manner to the outer wall 13 of the inner or hub structure A. It is preferred, however, that the inner ends of the springs 20 be threaded as at 21, so as to permit the said ends to be threaded into openings 22 which are spaced circumferentially around the outer connecting wall 13. It can be seen that this row of openings 22 is disposed intermediate the side edges of the wall 13. The outer ends of the shock absorbing coil springs 20 have connected thereto semi-spherical shaped heads 23, which are adapted to engage the inner face of the transversely curved connecting wall 16 of the outer or felly structure B in order to permit the effective supporting thereof by said springs. The outer ends of the springs 20 can also be provided with threads, for fitting in sockets 24 formed in the said semi-spherical heads 23. There can be as many coil springs 20 as is desirable or applicable. This forms a simple means for supporting the outer felly structure and which permits free movement thereof in relation to the inner or hub structure A.

In order to prevent the contacting of the metallic wall 16 with the roadway, so as to obviate the noise which would be incident thereto, the casing D is provided. The casing D can be formed of rubber suitably strengthened by fabric or cord as well known in the art of tire casing construction. As shown, this casing D consists of an annular transversely curved body 25 having the outer wall or tread 26 and the side walls 27. These side walls 27 are of such a length as to permit their inner edges to fit upon the annular shoulders 19 defined by the annular outstanding reinforcing ribs 18.

The means E for holding the casing D in position consists of semi-circular rings 30. These rings 30 have their outer edges provided with inwardly extending teeth 31, which are adapted to bite into the walls 27 of the casing D. If desirable, the inner edges of the walls 27 may be provided with beads 32, and the rings 30 adjacent to the teeth 31 may each be provided with an annular groove 33 for the reception of said beads. In order to hold the rings 30 in clamping engagement with the casing D, relatively short bolts 35 are provided. These bolts 35 are carried by the reinforcing ribs 18 and have their heads anchored in the same in such a manner as to prevent turning movement of the said bolts. The bolt heads are disposed flush with the inner surface of the side walls 14 and 15, so as to prevent the catching of the bolt heads on the inner surface of the plates 11 and 12. The rings 30 are provided with openings 36 for the reception of the threaded terminals of the bolts 35 and suitable nuts 37 can be threaded on the bolts 35.

In order to facilitate assembling of the wheel, the side plates 14 and 15 of the outer or felly structure B are preferably formed in two sections 40 and 41. These sections 40 and 41 are substantially semi-circular shaped and in the placing of the portions of the retaining rings 30, the points of connections of the sections of said rings are placed at 90° from the points of connection of the sections 40 and 41.

Transversely extending bolts 42 are provided for connecting the plates 14 and 15 together, so as to prevent the lateral bending thereof in relation to each other. These bolts extend all of the way through the wheel and in order to permit free movement of these bolts with the plates 14 and 15, during the shifting of the outer or felly structure B, transversely extending relatively large sleeves 43 are provided. These sleeves 43 are placed in suitable registering openings 44 in the side plates 11 and 12 of the hub or inner structure A, and can be secured therein in any preferred manner. The ends of these sleeves extend flush with the outer surface of the plates 11 and 12, so that the ends thereof will not catch in the side plates 14 and 15 when the wheel is in use.

In order to render the wheel absolutely silent in use, suitable lubricating means F is provided, and this lubricating means F forms an important part of the invention.

The lubricating means F consists of a plurality of cups 50 which are carried by and extend transversely of the inner or hub structure A. These cups are in the nature of sleeves, inasmuch as the opposite ends thereof are left open. The cups 50 are inserted in suitable openings 51 formed in the side plates 11 and 12 of the hub or inner structure A and secured therein in any preferred way. The side plate 15 of the outer or felly structure B can be provided with suitable removable plugs 52, which permit the introduction of grease into the said cups. The cups 50 are packed with hard grease and when the wheel is in use, the movement of the plates 14 and 15 in relation to the plates 11 and 12 will effectively lubricate the side faces thereof.

It is also desirable that the space in which the springs 20 operate also be filled or partly filled with hard grease and the plate 15 adjacent to the outer periphery thereof can also be provided with removable plugs 53, which will permit the introduction of hard grease into the space occupied by the springs when the casing D is removed.

It is to be noted that the portions of the retaining rings 30 perform a dual function; first, for retaining the casing D in position; and second, for retaining the sections 40 and 41 of the side plates 14 and 15 in place in relation to one another. The retaining of the sections 40 and 41 in place by the sections of the retaining rings 30 is accomplished by arranging certain of the bolts carried by the annular ribs 18, on opposite sides of the meeting edges of the sections 40 and 41 of the said plates 14 and 15.

Thus it can be seen that the sections of the rings 30 will bridge or overlie the meeting edges of the said sections 40 and 41.

In use of the improved wheel, free movement of the hub section A in relation to the outer or felly section B is permitted by the spring 29 which will effectively absorb all shock and all noise due to the contacting of parts of the metallic wheel will be obviated owing to the effective means provided for lubricating said parts.

Changes in details may be made without departing from the spirit or scope of this invention; but,

I claim:

1. In a resilient metallic shock absorbing wheel, a hub structure including a pair of side plates, a connecting outer annular wall for the side plates, an axle spindle box carried by the axial center of said plates, an outer felly structure including side plates consisting of semi-circular sections, the sections of the plates being connected together by an outer transversely curved wall, resilient means interposed between the outer walls of the hub and felly structures, a casing receiving the outer face of the felly structure, sectional retaining rings for the casing, annular strengthening ribs formed on the side plates of the felly structure for receiving said rings, bolts carried by the last mentioned side plates when extending through the rings, means carried by said bolts for engaging said rings to hold the same in position, the terminals of the sections of the rings being disposed at quarters in relation to the edges of the side plates of the felly structure, and teeth formed on said retaining rings for engaging the casing.

2. In a resilient metallic shock absorbing wheel, a hub structure including side disc shaped plates, an annular connecting outer wall, a felly structure including spaced side plates and an annular transversely curved connecting outer wall, resilient means disposed between said outer walls for absorbing shock and for holding the hub structure in concentric relation to the felly structure, transversely extending hard grease receiving sleeves carried by the side plates of the hub structure, the terminals of said sleeves extending flush with the outer face of the plates of the hub structure whereby the grease will be permitted to escape from said sleeves during the use of the wheel, and removable plugs carried by the side plates of the felly structure for permitting the packing of hard grease in said sleeves.

3. In a resilient metallic wheel, a hub structure, a plurality of radially extending coil springs having threaded shanks formed on the terminals thereof, the inwardly threaded shanks being connected with the outer face of the hub structure, an outer felly structure including annular side plates and a connecting transversely curved annular outer wall for connecting the outer edges of said side plates, the side plates of the felly structure engaging the sides of the hub structure, and semi-spherical solid heads carried by the outer threaded shanks of the springs engaging the inner periphery of the annular transversely curved connecting wall for the side plates of the felly structure.

JOHN ELMER McROBERTS.